(No Model.)
H. DEWEY.
BRAKE.
No. 367,965. Patented Aug. 9, 1887.
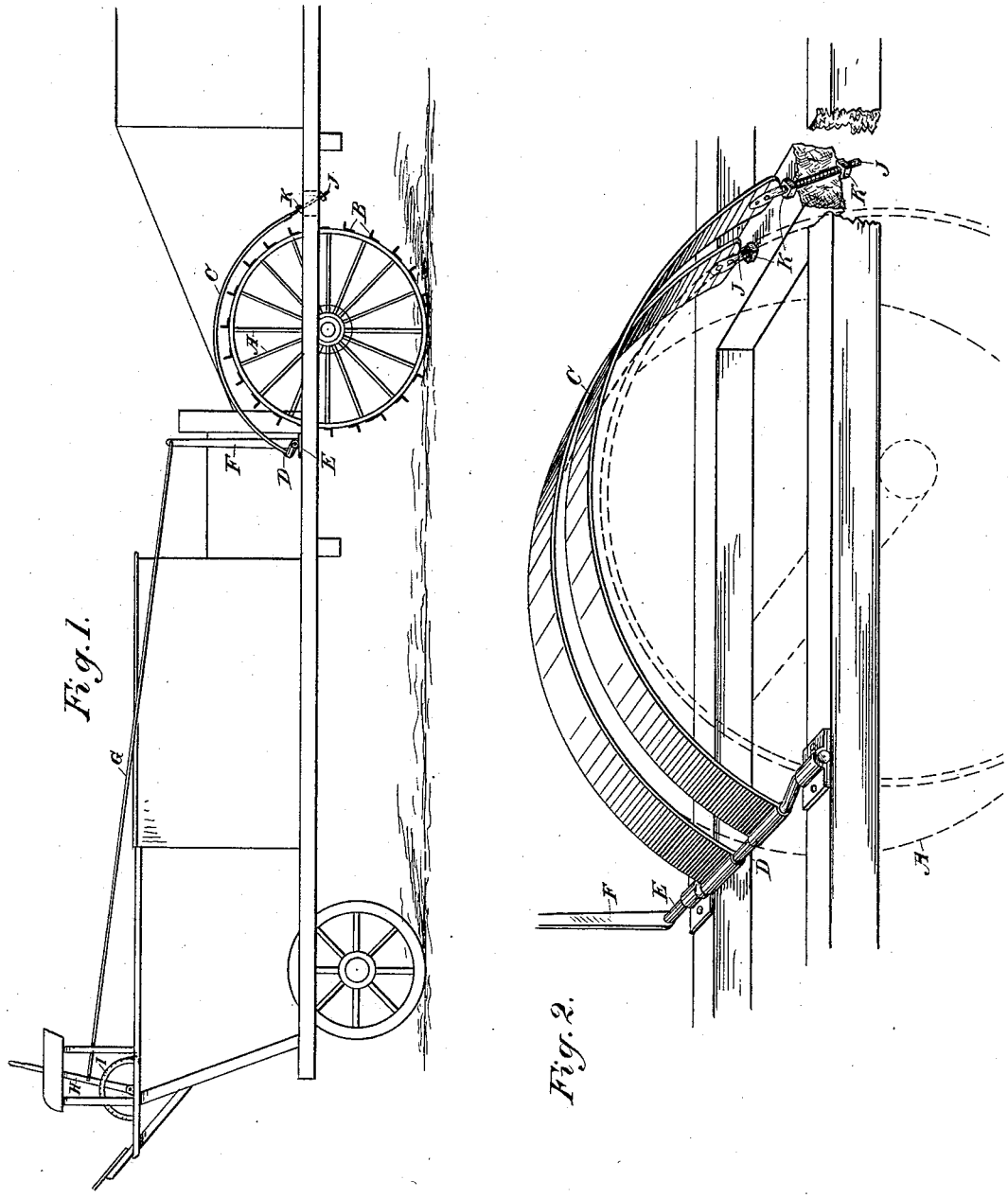
Witnesses,
Geo. H. Strong.
J. H. Nurse.
Inventor,
Henry Dewey.
By Dewey & Co.
attys

UNITED STATES PATENT OFFICE.

HENRY DEWEY, OF PLAINSBURG, ASSIGNOR TO DANIEL BEST, OF SAN LEANDRO, CALIFORNIA.

BRAKE.

SPECIFICATION forming part of Letters Patent No. 367,965, dated August 9, 1887.

Application filed May 28, 1887. Serial No. 239,713. (No model.)

*To all whom it may concern:*

Be it known that I, HENRY DEWEY, of Plainsburg, county of Merced, State of California, have invented an Improvement in Brakes for Combined Harvesters; and I hereby declare the following to be a full, clear, and exact description of the same.

My invention relates to a brake for combined harvester and thrasher; and it consists of one or more broad metal straps having one end attached to the frame of the machine, the straps passing above the ribs or projections on the main driving-wheel, and having the opposite end connected with crank-arms which are operated by the driver.

Referring to the accompanying drawings for a more complete explanation of my invention, Figure 1 is a view of the brake. Fig. 2 is a perspective view of the brake.

Since the employment of the large machines known as "combined harvesters," by which the reaping and thrashing of the grain is done at a single continuous operation, it has been necessary to employ large teams of animals to haul the machines about the field, and when a panic occurs in such a team it is impossible for the driver to control them. For this purpose I have designed a powerful brake, which can be applied to the main driving-wheel of the apparatus.

A is the main driving-wheel, which is provided with tranverse flanges B, usually made of angle-iron, and projecting about two inches from the face of the wheel, which is of considerable breadth. These deep flanges are necessary to give the wheel the proper hold on the ground to cause it to rotate and drive the machinery, and it is impossible to apply any ordinary brake to such a surface as is presented by the rim of this wheel.

C is my brake, which consists of one or more broad straps of sheet-metal, having one end secured to the frame-timbers and the other connected with short crank arm or arms D, the shaft of which is journaled across the frame-timbers at E, just in front of the wheel A.

The strap C curves over the upper part of the wheel, thus inclosing a considerable portion of its circumference, and when the crank-arms are raised so as to stand vertically the strap is out of contact with the projecting ribs or flanges; but when the crank-arms are turned downward they bring the strap into contact with the edges of these ribs, and as the strap incloses so large a segment of the wheel it makes a very powerful brake and holds the wheel perfectly still against any efforts of the team to drag it.

F is a lever secured to one end of the crank-shaft and extending upward to a considerable height, and this lever has a rod, G, which connects it with the hand-lever H, near the driver's seat, so that the driver may operate the brake by simply throwing the lever H forward.

I is a holding rack or segment, by which the brake-lever may be held in any desired position.

Although the strap may be made of a single broad sheet inclosing nearly the full face of the wheel, I have found it preferable to make the brake in the form of two straps standing side by side. As the crank-arms D, by which they are operated, have a short throw, it is necessary to adjust the length of the brake-straps, and I therefore weld to the rear end of each a strong bolt, J, having screw-threads cut upon it. Upon this bolt, above and below the frame-timber through which it passes, are nuts K, and by screwing these up or down upon the bolt the brake-strap may be lengthened or shortened at will.

Having thus described my invention, what I claim as new, and desire to secure by Letters Patent, is

1. A brake for a traveling harvester or thrasher, consisting of a broad band or segment passing over the top of the transverse ribs of the driving-wheel, having one end secured to the frame and the other connected with the crank or eccentric shaft, whereby it may be drawn down into contact with the edges of the ribs, substantially as described.

2. A brake for traveling harvesters or thrashers, consisting of one or more broad metal bands extending over the top of the wheel which has the transverse ribs or bars upon its periphery, said brake-strap having one end adjustably fixed to the frame-timbers upon one side of the wheel and the other end connected with the crank-shaft, a lever attached to said crank-shaft, and connecting-rod leading forward to the hand-lever near the driver's seat, substantially as described.

3. In combination with the driving-wheel of a traveling harvester having the projecting ribs or flanges upon its periphery, the broad band or bands having one end connected with the crank or eccentric, with lever attachments by which it is forced into contact with the periphery of the wheel, and the other end provided with the screw and adjusting nuts, whereby its length may be regulated, substantially as herein described.

In witness whereof I have hereunto set my hand.

HENRY DEWEY.

Witnesses:
S. H. NOURSE,
H. C. LEE.